United States Patent [19]

Gagliani et al.

[11] Patent Number: 5,416,173

[45] Date of Patent: May 16, 1995

[54] AMINE REACTED ACRYLATED EPOXY RESIN BLENDS SUITABLE FOR RADIATION CURED COMPOSITES

[75] Inventors: John Gagliani, San Diego, Calif.; Ronald K. Giesy, Katy, Tex.

[73] Assignee: Martin Marietta Corporation, Bethesda, Md.

[21] Appl. No.: 275,454

[22] Filed: Jul. 15, 1994

[51] Int. Cl.6 .............................................. C08L 63/00
[52] U.S. Cl. .................................... 525/526; 525/423; 525/531; 525/903; 525/922
[58] Field of Search ............... 525/423, 526, 531, 903, 525/922, 107

[56] References Cited

U.S. PATENT DOCUMENTS

| | | | |
|---|---|---|---|
| 4,359,370 | 11/1982 | De La Mare et al. | 528/112 |
| 4,374,963 | 2/1983 | Morgan et al. | 525/524 |
| 4,413,105 | 11/1983 | Koenig | 525/531 |
| 4,595,734 | 6/1986 | O'Hearn | 525/531 |
| 4,628,022 | 12/1986 | Ors et al. | 525/922 |
| 4,974,659 | 12/1990 | Shriver et al. | 523/139 |

Primary Examiner—Melvyn I. Marquis
Assistant Examiner—Randy Gulakowski
Attorney, Agent, or Firm—John R. Duncan; Frank D. Gilliam

[57] ABSTRACT

An amine reacted acrylated epoxy resin blend that is particularly suitable for impregnating a fiber material and at least initial curing by exposure to ionizing radiation. These epoxy resins are basically produced by combining epoxy resins, including esterified epoxy resins, with stoichiometric quantities of aliphatic or cyclo aliphatic polyamines. The resins can be used to impregnate fibers which are exposed to ionizing radiation such as an electron beam or ultraviolet light and immediately formed into a structure, such as by filament winding. A short exposure to the ionizing radiation produces a stress-free, self supporting structure that can be fully cured through simple heating without elaborate tooling, vacuum bagging, autoclaves or the like.

11 Claims, No Drawings

AMINE REACTED ACRYLATED EPOXY RESIN BLENDS SUITABLE FOR RADIATION CURED COMPOSITES

BACKGROUND OF THE INVENTION

This invention relates in general to epoxy resins and, more specifically, to amine reacted epoxy resin blends particularly useful in fiber reinforced composites with initial curing by low energy radiation and thermal final cure.

A great many different epoxy resin formulations, resin mixtures and methods of making epoxy resins have been developed over the years for a variety of different purposes and to manufacture many different products. Generally, these formulations have been optimized for the manufacture of products to be cured by exposure to elevated temperatures. Epoxy resins, for example, have come into widespread use as the matrix resin for fiber reinforced composite structures of many kinds.

Present methods for manufacturing products from resin impregnated fiber material generally arrange multiple layers of resin impregnated tow or fabrics on a tool surface, then use some method of applying uniform pressure to the laid-up material while heating the assembly to cure the resin. Typical methods of applying pressure include vacuum bagging, multiple staging and compaction operations, autoclave curing, closed die molding, etc. These methods are quite effective with reasonably small and thin products. However, they are less successful with large and/or thick products.

With large or thick products, the ability to cause volatile gases generated by the matrix resin to migrate along preferred pathways transverse to the fiber lengths into a breather/bleeder cloth or through vent ports becomes very difficult. Strength reducing large voids and general porosity occur in the final product if sufficient outgassing of these volatile gases is not accomplished.

In order to achieve uniform physical properties in a composite product, it is necessary that the resin distribution throughout the product be uniform. Resin migration or flow in lay-ups where the resin is liquid tends to be dominated by fiber tension and the preferential flow direction. A consequence is the tendency to have significantly lower resin contend fibers at the interior layers and higher than desirable resin content in the outer layers, resulting in lower composite strength and varying physical properties.

Thermal curing of thermosetting resins through cationic polymerization reactions have generally been used in the past. These require prolonged dwell times at relatively high temperatures to produce cross-linking and final curing of the matrix resin. The great amount of time required results in poor production efficiency. Controlling this type of reaction with large and/or thick structures is difficult due to the exothermic behavior common to thermosetting resins. These problems are most often dealt with by accepting extremely lengthy cure cycles which use very slow heat up rates and several constant temperature dwells. Total cure times in excess of 12 hours are not at all uncommon for very large and/or thick thermoset resin matrix composite structures.

Expensive high temperature capable tooling is required to withstand the processing heat and pressures required in these prior processes. Most often this requires expensive metal tooling which can be difficult to machine, heavy and creates a large thermal mass that must be accounted for in the cure cycle development.

In some cases, thermoplastic matrix materials are used in fiber reinforced composites. Processing times for thermoplastic resins can be relatively short, since they only require heating beyond their melting temperatures with consolidation pressure to cause complete laminate consolidation. However, in many cases the processing temperature are quite high, requiring more expensive and complex tooling. In addition, most of the advanced thermoplastic matrix materials are much more expensive that equally performing thermosetting resin matrix materials.

Radiation curing of resin matrix composite parts has been used in some instances. These processes are intended for the polymerization and curing of fully laid up composite material in its final size and thickness through the use of very high energy electron beam radiation sources, typically around 20 kW, 10 MeV and X-rays in doses up to 10 Mrad. These processes rely on very high energy radiation to penetrate great distances into the composite structure, up to about 12 inches, to effect complete curing of the part in its entirety. Such high energy radiation sources are very costly to design and construct. Containment of the radiation requires isolating the radiation sources behind very thick, often greater than six feet thick, concrete walls. The entire assembly of tooling and composite material must be moved into the chamber for curing.

Different thermosetting resins and different end uses for composite structures may require different polymerization and curing methods. Cryogenic applications, such as liquid hydrogen and oxygen containers for space launch vehicles, containers, piping and the like for superconducting magnet cooling systems using liquid helium or liquid nitrogen require composites having acceptable physical properties at extremely low temperatures. Prior methods and materials for use in fabricating structures for use at cryogenic temperatures have not been fully satisfactory.

Thus, there is a continuing need for improved resin systems and methods of polymerizing and curing the resin matrices in fiber reinforced composite manufacture which can employ high energy radiation, such as electron beam or ultraviolet radiation to initiate cure to a shape retaining state, use simple, inexpensive tooling, produce a final cure by thermal means, reduce voids and other variations in the product and produce structures useful under a variety of conditions.

SUMMARY OF THE INVENTION

The above-noted problems, and others, are overcome in accordance with this invention by an amine reacted acrylated epoxy resin, diglycidal ether of bisphenol-A, blend that can be used to impregnate a fiber material, be rapidly cured to a shape retaining state by exposure to electron beam or ultraviolet radiation or a combination thereof, and after filament winding or other assembly of the impregnated fibers, be fully cured at ambient temperatures or by heating. Any suitable fibers may be impregnated with these resins. Typical fibers included graphite, carbon, aramid, glass and combinations thereof.

The new epoxy resins suitable for use as matrix resins for fiber reinforced composites are produced, basically, by combining the esterified epoxy resin, diglycidal ether of bisphenol-A, with stoichiometric quantities of aliphatic or cycloaliphatic polyamines. Exposure of fiber material impregnated with these resins to ultraviolet or electron beam radiation for a short period, typically as little as 60 seconds will produce a stress-free, self supporting, form stabilized, composite structure. With ultraviolet radiation, the use of a photoinitiator is often desirable. A full cure can then be accomplished through simple heating without any elaborate tooling, autoclaves, etc., or at ambient temperatures for extended periods. Since the radiation initial curing is a continuous process, this resin is particularly suitable for filament winding applications.

The basic process for forming the resins includes combining a digycidal ether of bisphenol-A with partially or fully esterified epoxy resins, obtained by reacting epoxy compounds with acrylic or methacrylic acid, with stoichiometric quantities of aliphatic or cycloaliphatic polyamines. A photoinitiator is preferred when using ultraviolet radiation to start the reaction. The resins undergo cure by chain extension of the end-unsaturated groups followed by addition of the unreacted unsaturated groups to the amine groups and final crosslinking of the free epoxy groups by cationic polymerization.

Mechanical and thermal properties of the final resins can be altered by modification of the ratio of the fully or partially esterified epoxy compounds to the polyamine and by varying the temperature used for the final curing.

The polymerization reactions of this new resin system during and after the ionizing radiation curing are quite complex. We believe that, when the amine is added to the resin system just prior to the radiation exposure, the prevailing reaction is chain extension of the end-unsaturated groups. This reaction is followed by the room temperature cationic polymerization of the epoxy groups and by the Michael's addition reaction of any unreacted end-unsaturated groups with the amine. The advantages of this new resin system include higher glass transition temperature of the final cured polymers and ambient temperature or slightly elevated temperature final cure conditions for continuous processing of resin impregnated fiber reinforced composite materials not possible with conventional epoxy resins.

Fabrication of resin impregnated fiber reinforced composite structures by the filament winding process is particularly effective with this type of resin because it permits fabrication of large and/or very thick composite structures without the need for costly thermal curing processes. By avoiding the elevated temperature cure cycle typically required, the process holds the advantages of low cost, low temperature stable tooling materials instead of costly metal tooling, greater dimensional stability and minimal residual stresses arising from ambient curing, and elimination of time-consuming, manual tasks such as vacuum bagging.

DETAILED DESCRIPTION OF PREFERRED EMBODIMENTS

Initially, a diglycidyl ether of bisphenol-A is reacted with an ethylenic unsaturated carboxylic acid in the presence of an amine salt to produce a diester of the diglycidyl ether of bisphenol-A. Any suitable diglycidyl ether of bisphenol-A may be used, such as those available under the trademarks Epon 825, Epon 826, Epon 828 and Epon 1001 from the Shell Chemical Co., Tactix 123, Tactix 138, and DEN 438 from the Dow Chemical Co., or mixtures thereof. For best results, the diglycidyl ether of bisphenol-A selected should have low viscosity and a wide molecular weight range.

Any suitable ethylenic unsaturated carboxylic acid may be used in this reaction. Typical of such carboxylic acids are methacrylic acid, acrylic acid, and mixtures thereof. Of these, methacrylic acid is preferred because the epoxy methacrylates are characterized by low viscosity, important in resin infiltration processes such as filament winding.

The amine curing agent may be any suitable diamine. Typical of such amine curing agents are aliphatic amines, cycloaliphatic amines, and mixtures thereof. Any suitable diamine may be used, such as cycloaliphatic amines available under the trademarks Ancamine 2049 and Ancamine 1948 from Pacific Anchor Chemical, Los Angeles, Calif., amines T 403 from Texaco Chemical, Inc., Houston, Tex. and tetraethylenepentamine (TEPA) from Pacific Anchor Chemical, Los Angeles, Calif. Best results are obtained with cycloaliphatic amines.

Where a thermal means such as infrared radiation is to be used for initial curing of the modified epoxy resin, a thermal decomposition catalyst such as methylethyl ketone peroxide, benzoyl peroxide, cumene peroxide, or mixtures thereof may be mixed into the unmodified epoxy resin component. While any suitable quantity may be used, generally from about 0.5 to 2.0 parts by weight are preferably used per 100 parts by weight resin. Where ultraviolet light (UV) radiation is to be used for initial curing of the modified epoxy resin, any suitable photoinitiator such a 1-hydroxycyclohexyl phenyl ketone may be used. Preferably, from about 0.5 to 2.0 parts by weight are used per 100 parts by weight resin.

The preferred reactants mentioned above are liquid or low melting point solids and produce resin compositions possessing low viscosity and long working life. If desired, various additives may be included to improve selected physical qualities of the final cured product such as flammability. Typical additives include surfactants such as Dow Corning 199 and FC-430 from the 3M Co., inorganic fillers such as aluminum powder and aluminum hydroxide, dyes and pigments such as titanium dioxide and carbon powder, flexibilizing compounds such as Epon 871 and 872, aliphatic diepoxy resins available from the Shell Chemical and mixtures thereof.

The preparation of the novel acrylic modified epoxy resin blend begins with reacting the selected diglycidyl ether of bisphenol-A with the selected ethylenic unsaturated carboxylic acid at a mole ratio of 1.0 to 1.1 moles diglycidyl ether to carboxylic acid in the presence of an amine salt at a concentration of about 1.0 to 5.0% based on the diglycidyl ether. The esterification reaction is carried out at a temperature of from about 70° to 95° C. for about 6 to 10 hours, producing an initial acrylated ester of epoxy resin.

In the preparation of the final acrylic modified epoxy resin blend, about one part of the diglycidyl ether of bisphenol-A is mixed with about one part of the acrylated ester of epoxy resin and the preferred stoichiometric amount of amine curing agent based on the diglycidyl ether.

Initial curing of the amine reacted acrylic modified epoxy resin blend is accomplished by exposure to a selected level of ionizing radiation (either EB or UV). While EB or UV radiation is preferred, x-ray radiation may be used in some circumstances. The above mentioned ionizing radiation exposure is performed at ambient temperature to produce a form stabilized, shape retaining, composite structure by means of a free radical polymerization reaction through the end-unsaturated groups.

Final curing of the amine reacted acrylic modified epoxy resin blend is accomplished by further exposure to ambient temperature to foster the aliphatic or cycloaliphatic amine curing of the unmodified epoxy component through cationic polymerization. Proper proportioning of the acrylated epoxy resin can achieve a form stabilized structure sufficient to withstand a slightly elevated temperature post cure with or without tooling support. Such a post cure is preferred to optimize the resin temperature resistance. The results obtained from this procedure demonstrate a controlled epoxy polymerization reaction performed at ambient temperature through a blending of fully unsaturated acrylated epoxy resin with an unmodified epoxy and amine curing agent. Such a blended resin contains a reactive component which, when exposed to ionizing radiation such as EB or UV, undergoes a free radical polymerization reaction producing a rapidly form stabilized material at ambient temperature. Thus, upon further exposure to ambient temperature or slightly elevated temperature, produces a fully cured epoxy resin ideal for resin impregnated fiber reinforced composite processing. The post-cure is preferably carried out at a temperature of from about 50° to 150° C.

Such a blended resin contains a component which reacts completely by radiation exposure to create a fully polymerized structure within the unmodified epoxy resin. Thus an interpenetrating polymer network (IPN) structure can be formed by crosslinking the unmodified epoxy resin component within the radiation cured unsaturated resin component. Formation of the IPN structure provides the much needed interlaminar polymer bonding which translates into acceptable interlaminar composite strength.

Details of several preferred embodiments are provided in the following examples. Parts and percentages are by weight unless otherwise indicated.

EXAMPLE I

A methacrylate diester of diglycidyl ether of bisphenol-A was prepared as follows. About 100 parts of Epon 826, about 0.625 parts of trimethylamine hydrochloride and about 0.125 parts of hydroquinone were mixed in a 3 liter, 3 neck flask and heated with continuous stirring at about 80° C. About 50 parts methacrylic acid was added to the mixture over a period of about 1 hour while maintaining this temperature. The mixture was then held for about an additional 6 hours at this temperature. The crude product was transferred to a metal container and stored at ambient temperature. The fully unsaturated ester of epoxy was blended with about 2 percent by weight methylethylketone peroxide (MEKP) acting as a thermal decomposition supplier of free radicals.

The 0.125 inch thick casting was released from the mold and cut into 0.5 inch by 2.5 inch cured resin samples. The samples were tested for glass transition temperature (Tg) by dynamic mechanical analysis (DMA) using a TA Instruments DMA model 983 with the data managed on a personal computer running Thermal Analyst 2100 software supplied by TA Instruments, Inc. New Castle, Del. The sample was tested in a fixed frequency mode at 1.0 Hertz and with a displacement of 0.5 mm. The sample was heated at a temperature increase rate of about 2° C. per minute from −150° to 200° C. A plot was generated for the elastic modulus (E') and the loss modulus (E") of the resin across the temperature range tested. The value for the glass transition temperature was defined as the peak in E".

EXAMPLE II

The acrylated epoxy resin prepared as in Example I was blended with a diglycidyl ether of bisphenol-A epoxy resin and a cycloaliphatic amine curing agent as follows. About 100 parts of Epon 826 epoxy was mixed with a stoichiometric ratio of 32 parts of Ancamine 2049. A thermal decomposition source of free radicals was supplied by adding about 2 percent by weight MEKP. This unmodified amine epoxy resin was blended with about 100 parts of the acrylated epoxy resin of Example I. The mixture was poured into a mold and held at ambient temperature for a period of about 12 hours. The resin gelled in less than 15 minutes. The ambient cure was followed by a post cure at about 93° C. for about 4 hours.

These resins undergo cure by a two-step mechanism which includes free radical polymerization of the fully unsaturated ester of epoxy by the addition of MEKP and cationic polymerization and crosslinking of the amine reacted epoxy and acrylated epoxy resin blend. The entire reaction is completed at ambient temperature but is followed by an elevated temperature post cure to improve temperature stability of the fully cured polymer.

The 0.125 inch thick casting was released from the mold and cut into 0.5 inch by 2.5 inch cured resin samples. The samples were tested for glass transition temperature (Tg) by dynamic mechanical analysis (DMA) using a TA Instruments DMA model 983 with the data managed on a personal computer running Thermal Analyst 2100 software supplied by TA Instruments, Inc. New Castle, Del. The sample was tested in a fixed frequency mode at 1.0 Hertz and with a displacement of 0.5 mm. The sample was heated at a temperature increase rate of about 2° C. per minute from −150° to 200° C. A plot was generated for the elastic modulus (E') and the loss modulus (E") of the resin across the temperature range tested. The value for the glass transition temperature was defined as the peak in E". The Tg measured by DMA for this amine reacted acrylated epoxy resin blend was 78° C.

EXAMPLE III

The amine reacted acrylated epoxy resin blend prepared as in Example II was made with a diglycidyl ether of bisphenol-A epoxy resin and a cycloaliphatic amine curing agent, except using a lesser amount of the acrylic resin as follows. About 100 parts of Epon 826 epoxy was mixed with a stoichiometric ratio of 32 parts of Ancamine 2049. A thermal decomposition source of free radicals was supplied by the mixing of about 2 percent by weight MEKP. This unmodified amine epoxy resin was blended with 50 parts of the acrylated epoxy resin of Example I. The mixture was poured into a mold and held at ambient temperature for a period of about 12 hours. The resin gelled in less than 15 minutes. The ambient cure was followed by a post cure at about 93° C. for about 2 hours. The 0.125 inch thick casting was released from the mold and cut into 0.5 inch by 2.5 inch cured resin samples. The samples were tested for glass transition temperature (Tg) by dynamic mechanical analysis (DMA) using the equipment and method described in Example I. The Tg measured by for this amine reacted acrylated epoxy resin blend was 83° C.

EXAMPLE IV

The amine reacted acrylated epoxy resin blend prepared as in Example III was made with a diglycidyl ether of bisphenol-A epoxy resin and a cycloaliphatic amine curing agent, except using a still lesser amount of the acrylic resin as follows. About 100 parts of Epon 826 epoxy was mixed with a stoichiometric ratio of about 32 parts of Ancamine 2049. A thermal decomposition source of free radicals was supplied by the mixing about 2 percent by weight MEKP. This unmodified amine epoxy resin was blended with about 15 parts of the acrylated epoxy resin of Example I. The mixture was poured into a mold and held at ambient temperature for a period of about 12 hours. The resin gelled in less than 15 minutes. The ambient cure was followed by a post cure at 93° C. for about 2 hours. The resulting 0.125 inch thick casting was released from the mold and cut into 0.5 inch by 2.5 inch cured resin samples. The samples were tested for glass transition temperature (Tg) by dynamic mechanical analysis using the equipment and method described in Example I. The Tg measured by DMA for this amine reacted acrylated epoxy resin blend was about 97° C.

EXAMPLE V

The acrylated epoxy resin prepared as in Example I was blended with a diglycidyl ether of bisphenol-A epoxy resin, a cycloaliphatic amine curing agent, and an aliphatic amine curing agent as follows. About 100 parts of Epon 826 epoxy was mixed with a stoichiometric ratio of about 16 parts of Ancamine 2049 and about 21 parts of T 403. A thermal decomposition source of free radicals was supplied by the mixing of about 2 percent by weight MEKP. This unmodified amine epoxy resin was blended with about 100 parts of the acrylated epoxy resin of Example I. The mixture was poured into a 2 inch circular aluminum dish at ambient temperature and was periodically checked for indications of resin gelation. The resin was found to gel within 10 minutes. The sample was placed in an air circulating oven set at about 93° C. and observed for indications of full cure. Full cure was noted within 20 minutes. The 0.25 inch nominal thickness resin casting was removed from the dish and tested for brittleness by a crude method of dropping the casting onto a hard tile floor from a height of about 4 feet. The sample did not break.

EXAMPLE VI

The acrylated epoxy resin prepared as in Example I was blended with a diglycidyl ether of bisphenol-A epoxy resin and an aliphatic amine curing agent as follows. About 100 parts of Epon 826 epoxy was mixed with a stoichiometric ratio of about 18 parts of tetraethylenepentaamine (TEPA). A thermal decomposition source of free radicals was supplied by the addition of about 2 percent by weight MEKP. This unmodified amine epoxy resin was blended with about 100 parts of the acrylated epoxy resin of Example I. The mixture was poured into a 2 inch circular aluminum dish at ambient temperature and was periodically checked for indications of resin gelation. The resin was found to gel within 8 minutes. The sample was placed in an air circulating oven set at 65° C. and observed for indications of full cure. Full cure was noted within 10 minutes. The 0.25 inch nominal thickness resin casting was removed from the dish and tested for brittleness by a crude method of dropping the casting onto a hard tile floor from a height of about 4 feet. The sample did not break.

EXAMPLE VII

The amine reacted acrylated epoxy resin blend prepared as in Example VI was made with a diglycidyl ether of bisphenol-A epoxy resin, an aliphatic amine curing agent, and an additive to impart flame retardant properties as follows. A sufficient amount of ammonium dihydrogen phosphate ($NH_4H_2PO_4$) was pulverized in a mortar. About 100 parts of Epon 826 epoxy was mixed with a stoichiometric ratio of about 18 parts of tetraethylenepentaamine (TEPA). About 30 parts of the $NH_4H_2PO_4$ additive was added. A thermal decomposition source of free radicals was supplied by the mixing of about 2 percent by weight MEKP. This flame retardant modified amine epoxy resin was blended with about 100 parts of the acrylated epoxy resin of Example I. The mixture was poured into an aluminum dish at ambient temperature. The sample was placed in an air circulating oven set at 65° C. and cured for about 2 hours. The 0.25 inch nominal thickness resin casting was removed from the dish and tested for flame retardant properties. The sample was held directly over a Bunsen burner fueled by natural gas. The sample was observed to not burn, but it intermesces. The sample would not support burning away from the flame.

EXAMPLE VIII

A graphite fiber tow of the sort available under the designation IM7 from Hercules was impregnated with a resin made in accordance with Example II to which was added about 1.0 part 1-hydroxycyclohexylphenyl ketone pre 100 parts resin as a photo initiator. No MEKP was added to this resin. The impregnated tow was wound onto a rotating cylindrical mandrel. Immediately before placement of the tow onto the mandrel, the tow was exposed to a EPIQ 6000 irradiation, produced by Fusion Systems, with a UV output of about 240 w/cm for about 20 seconds. The resin immediately gelled to a shape retaining state. Upon completion of winding, the assembly was heated at about 60° C. for about 2 hours to complete the cure, with no tooling or other support for the wound tubular assembly.

EXAMPLE XI

A graphite fiber tow of the sort available under the designation IM7 from Hercules was impregnated with a resin made in accordance with Example IV, but without the addition of the MEKP thermal decomposition source for free radicals. Immediately before placement of the tow onto the mandrel, the two was exposed to an electron beam source at a level of about 6 MeV for about 30 seconds. The electron beam sours was provided by the University of Maryland Linear accelerator. The resin immediately gelled to a shape retaining state. After the application of the tow to the mandrel by filament winding was complete, the assembly was heated at about 93° C. for about 2 hours, with no tooling or other support for the impregnated tow, to complete resin cure.

EXAMPLE X

A graphite fiber tow of the sort available under the designation ASH-G-12K from Hercules was impregnated with a resin made in accordance with Example II.

The impregnated tow was wound onto a rotating cylindrical mandrel. Just before the tow reaches the mandrel, the tow was exposed to ultraviolet radiation at a level of about 300 watts/in. The resin immediately gelled into a form stabilized, shape retaining, state. When winding was complete, the assembly was heated at about 93° C. for about 4 hours to complete the cure, with no tooling or other support for the wound tubular assembly.

While the above descriptions of preferred embodiments provided specific materials, conditions and other parameters, those can be varied, where suitable, with similar results. Other applications, ramifications, and variations will become apparent to those skilled in the art upon reading the above disclosures. Those are intended to be included within the scope of this invention, as defined in the appended claims.

We claim:

1. A method of making a diamine reacted acrylic modified epoxy resin blend suitable for use as a matrix resin in composite products which comprises the steps of:
    preparing a diunsaturated ester of diglycidyl ether of bisphenol-A by reacting about 100 parts by weight of a diglycidyl ether of bisphenol-A epoxy an ethylenic unsaturated carboxylic acid in a mole ratio of diglycidyl ether of bisphenol-A to ethylenic unsaturated carboxylic acid of from about 1:1 to 1:1.1;
    preparing an unmodified epoxy resin by mixing 100 parts of a diglycidyl ether of bisphenol-A epoxy with a stoichiometric quantity of a diamine curing agent;
    mixing about 100 parts by weight of said epoxy resin with from about 15 to 100 parts by weight of said unsaturated ester;
    subjecting the resin to ionizing radiation selected from the group consisting of electron beam, ultraviolet light and combinations thereof to initiate initial cure of the resin by free radical polymerization.

2. The method according to claim 1 wherein said ethylenic unsaturated carboxylic acid is selected from the group consisting of acrylic acid, methacrylic acid and mixtures thereof.

3. The method according to claim 1 wherein said diamine curing agent is selected from the group consisting of aliphatic diamines, cycloaliphatic diamines and mixtures thereof.

4. The method according to claim 1 including the further step of adding from about 0.1 to 0.5 parts by weight hydroquinone to the mixture as a stabilizer.

5. The method according to claim 1 including the further step of adding from about 0.5 to 2.0 parts by weight per 100 parts by weight resin of 1-hydroxycyclohexylphenyl ketone as a photoinitiator.

6. The method according to claim 1 including the further step of adding from about 0.5 to 2.0 parts by weight per 100 parts by weight resin of a thermal decomposition catalyst selected from the group consisting of methylethyl ketone peroxide, benzoyl peroxide, cumene peroxide, and mixtures thereof to said unmodified epoxy resin.

7. The method according to claim 1 including the further step of adding additives to impart improvements in physical properties selected from the group consisting of surfactants, wetting agents, dyes, fillers, and mixtures thereof.

8. The method according to claim 1 wherein cure of the acrylic modified epoxy resin blend is completed at ambient temperature.

9. The method according to claim 8 wherein said ambient temperature cure is followed by an elevated temperature post cure to improve temperature stability of the fully cured polymer through higher crosslinking density.

10. The method according to claim 1 including the further steps of infiltrating at least one fiber selected from the group consisting of carbon, graphite, glass, aramid and combinations thereof, prior to exposing the resin infiltrated fiber to said ionizing radiation and immediately after said exposure forming said fiber into a composite structure.

11. The method according to claim 10 wherein said composite structure is produced by winding said at least one fiber about a mandrel.

* * * * *